United States Patent [19]

Stadtfeld et al.

[11] Patent Number: 5,257,882
[45] Date of Patent: Nov. 2, 1993

[54] APPARATUS AND METHOD FOR MANUFACTURING LONGITUDINALLY CURVED TOOTH GEARS

[75] Inventors: Hermann Stadtfeld, Dielsdorf; Manfred Knaden, Zurich, both of Switzerland; Gerhard Brandner, Chemnitz, Fed. Rep. of Germany

[73] Assignee: Oerlikon Geartec AG, Zurich, Switzerland

[21] Appl. No.: 837,937

[22] Filed: Feb. 20, 1992

[30] Foreign Application Priority Data

Mar. 1, 1991 [CH] Switzerland .................... 00632/91

[51] Int. Cl.$^5$ ............................................. B23F 9/00
[52] U.S. Cl. ........................................ 409/26; 409/51
[58] Field of Search .................. 409/25, 26, 27, 30, 409/31, 38, 39, 50, 51; 51/287, 52 R, 105 GG

[56] References Cited

U.S. PATENT DOCUMENTS

| 3,212,403 | 10/1965 | Deakin .................. 409/27 |
| 4,780,990 | 1/1988 | Cody et al. |
| 4,930,950 | 6/1990 | Stadtfeld |
| 4,981,402 | 1/1991 | Krenzer et al. |

FOREIGN PATENT DOCUMENTS

| 0355318 | 2/1990 | European Pat. Off. |
| 3643967 | 7/1987 | Fed. Rep. of Germany |
| 259369 | 8/1988 | Fed. Rep. of Germany ........ 409/27 |
| 3805360 | 8/1989 | Fed. Rep. of Germany |
| 3805665 | 9/1989 | Fed. Rep. of Germany |
| 8707551 | 12/1987 | World Int. Prop. O. |
| 8901838 | 3/1989 | World Int. Prop. O. |

OTHER PUBLICATIONS

G. Spur et al., "Handbuch der Fertigungstechnik", Part 2, vol. 3, 1980, C. Hanser Verlag, Munich, Germany, pp. 442-446.
T. Krenzer et al., "Werkstatt und Betrieb", vol. 122, No. 3, 1989, C. Hanser Verlag, Munich, Germany pp. 237-242.
H. Stadtfeld, "Oerlikon Bevel and Hypoid Gears", 1989, Werkzeugmaschinenfabrik Oerlikon-Buhrle AG., Zurich, Switzerland, pp. 41-56.
Y. I. Evstegneev et al. "Soviet Engineering Research", vol. 4, No. 4 1984 Melton Mobrag GB, pp. 52-53.

Primary Examiner—Daniel W. Howell
Attorney, Agent, or Firm—Sandler Greenblum & Bernstein

[57] ABSTRACT

At the gear manufacturing machine there are automatically fabricated longitudinally curved tooth gears, especially longitudinally curved tooth bevel and hypoid gears according to conventional stock-removal form or generating methods. In order to improve both the mechanical stability and kinematic stability, the gear manufacturing machine contains only so-to-speak "natural" gear manufacturing or cutting axes, and, in particular, does not contain any hypoid stock, however, a generating drum. With the method of operating such gear manufacturing machine it is possible to fabricate hypoid gears during the generating operation by performing an additional movement of the workpiece in the lengthwise direction of the tooth pitch cone.

2 Claims, 4 Drawing Sheets

APPARATUS AND METHOD FOR MANUFACTURING LONGITUDINALLY CURVED TOOTH GEARS

BACKGROUND OF THE INVENTION

1. Field of the Invention

The present invention relates to a new and improved fully automated machine or apparatus for automatically manufacturing or "cutting" gears, especially longitudinally curved tooth gears and to a method of operating such gear manufacturing or "cutting" machine or apparatus for the fabrication of gears, particularly bevel and hypoid gears.

Generally speaking, the gear manufacturing machine of the present development for automatically manufacturing longitudinally curved tooth gears according to a forming or generating process, is of the type wherein through integration or operative coaction of controlled and regulated drives, an electronic transmission or gear box and a control computer, there can be controlled machine axes and machine spindles during both machine set-up and machine operation. In particular, the inventive gear manufacturing machine comprises a machine base or bed and a pivotable table mounted at the machine base and pivotable about a predetermined pivot axis. This pivotable table is provided with a headstock or support mounted at the pivotable table for radial displacement with respect to the predetermined pivot axis. This headstock is provided with a workpiece or work spindle having a predetermined workpiece spindle axis or work axis. A generating stock or support is arranged at the machine base. A generating drum is mounted at the generating stock or support. The generating drum is rotatable about a generating axis or tool axis. A tool spindle is mounted at the generating drum for rotation about a predetermined tool spindle axis. Furthermore, there are provided means for shifting or displacing the generating stock or the pivotable table relative to one another along the generating axis.

2. Discussion of the Background and Material Information

Modern day gear manufacturing or generating machines enable fully automated gear manufacture by removal of stock or material from a workpiece using end cutter heads while employing a continuous indexing method or intermittent indexing method. It is also possible to use suitable grinding tools.

Such type of gear manufacturing or cutting machine has been disclosed in European Published Patent Application No. 0,355,318, published Feb. 28, 1990 and the cognate U.S. Pat. No. 4,930,950, granted Jun. 5, 1990. A motor-driven generating drum rotatably mounted in a generating stock additionally contains, however, three further setting drums, each of which are rotatably mounted. Specifically, such three further setting drums comprise an eccentric drum, an orientation drum and an inclination drum. Prior to performing the gear cutting operation, these setting drums must be setup in such a manner that the cutter head which has been mounted for rotation at such drums, as the tool assumes a proper or desired position for cutting a gear. Apart from this, it is necessary to additionally set the pivotable table about the vertical pivot axis, the workpiece headstock radially with respect to the pivot axis and, additionally, a vertically displaceable carriage or slide (the hypoid stock or support) All of these machine settings are automatically setup and locked in position by means of an electronic control device Both the machine setup work and the gear cutting operation are automatically performed by a diskette or other suitable data carrier inserted into the electronic control device. The three additional drums required for the inclination of the cutter head, however, result in complex, expensive solutions which are associated with problems of rigidity of the gear cutting machine.

German Published Patent Application No. 3,643,967, published Jul. 2, 1987 and International PCT Application No. PCT/US87/02083, filed Aug. 24, 1987 and published as International Publication No. WO 89/01838 on Mar. 9, 1989, teach gear generating machines serving the same purpose. These gear generating machines use fewer movable machine axes and, in particular, do not use any generating drum. There are provided three mutually orthogonally arranged machine axes, a pivot axis and two machine spindles. The generating motion is produced by at least two of the orthogonal axes and the offset of the axes (hypoid arrangement of non-intersecting axes) is produced by at least one of the orthogonal axes. Furthermore, there is not provided any inclination device or tilting facility for the cutter head spindle Automation of all of the operations is accomplished by control means and appropriately regulated drive means for these machine axes and spindles. There thus can be realized all gear cutting operations and setting possibilities of conventional gear cutting or manufacturing machines and are assumed to be known, especially also the kinematic equivalent of inclining or tilting the cutter head as well as correction of the longitudinal form of the tooth flanks, with single flank cutting, double flank cutting and so forth. However, during the gear generating operation, kinematic stability problems arise due to the arrangement of the axes as well as by virtue of the resultant pronounced non-linear motion patterns.

Older conventional gear manufacturing or cutting machines are known in this technology wherein the workpiece spindle is driven in synchronism with the tool spindle and the generating movement is accomplished by gear trains. A control mechanism controls the rapid traverse and forward feed of a generating stock during the operating phases. A generating drum is mounted at the generating stock. A transverse carriage or slide is additionally arranged at the generating drum and a tool spindle is mounted, if desired, for limited pivotable movement, for instance, through an angle of about 3°, at the transverse carriage or slide. Furthermore, a vertically displaceable hypoid carriage or slide is additionally arranged at the workpiece headstock and is mounted to be manually shiftable upon the pivotable pivot table. All of the machine axes, apart from the two rotary spindles, the generating stock and the generating drum, can be manually set and subsequently locked in place. However, these machines no longer comply with present day production requirements.

SUMMARY OF THE INVENTION

Therefore, with the foregoing in mind, it is a primary object of the present invention to provide an improved machine for automatically manufacturing longitudinally curved tooth gears and to an improved method of operating such gear manufacturing machine for the fabrication of gears, particularly bevel and hypoid gears, which are not afflicted with the aforementioned shortcomings and drawbacks.

Another and more specific object of the present invention aims at achieving an improved gear manufacturing machine which enables attaining a particularly rigid machine construction with a minimum of movable structural parts, and thus, simplifies the integration of power electronics and NC-technology, and additionally, provides a gear manufacturing method which enables employment without limitation of the gear manufacturing machine.

Still a further noteworthy object of the present invention is the provision of an improved machine for automatically generating longitudinally curved tooth gears, which is relatively simple in construction and design as well as extremely versatile and reliable in operation.

Now in order to implement these and still further objects of the present invention, which will become more readily apparent as the description proceeds, the gear manufacturing apparatus of the present development is manifested, among other things, by the features that a displaceably guided computer-controlled eccentric disk is arranged at the generating drum, and the tool spindle is arranged at the displaceably guided computer-controlled eccentric disk. The tool spindle has an axis which is disposed substantially parallel to the generating axis. The workpiece spindle is spatially stationarily or fixedly arranged in the headstock, and the pivotable table and the headstock also can be moved and regulated during the gear manufacturing operation.

According to a further feature of the present invention, the axis of the workpiece spindle intersects the generating axis.

Another aspect of the present invention contemplates that the axis of the workpiece spindle intersects the pivot axis.

As alluded to above, the present invention is not only concerned with such gear manufacturing machine, but also concerns a method of operating such gear manufacturing machine, wherein a tool is mounted at the tool spindle and a workpiece is mounted at the workpiece spindle. The method contemplates fixedly setting the axis of the tool spindle at the generating drum in a predetermined position in relation to the generating axis by means of the eccentric disk, and as a function of or in dependency upon the rotation of the generating drum accomplishing a movement of the workpiece in the direction of the tooth pitch cone in such a manner that the axis of the tool spindle describes a resultant rotational movement about a fictive rotational axis of an imaginary generating gear having a substantially constant radius.

Still further, this movement of the workpiece can be realized by performing a superimposed movement of the machine axis of the generating stock and a movement of the machine axis of the headstock.

Some of the more notable advantages of the present invention reside in the fact that all of the machine axes constitute or define "natural" gear cutting axes and also constitute axes which are relevant for theoretical gear cutting, so that the interlinked motion patterns are relatively simple and practically linear and there are present modest velocities. The axes of the workpiece spindle, the pivotal table and the generating drum advantageously intersect at a single point. Additionally, the inventive gear manufacturing machine beneficially does not require any hypoid stock. Moreover, the setting or adjustment of the eccentric disk or eccentric at the generating drum can be maintained constant during the gear manufacturing operation. As a result, there is realized extremely good mechanical stability as well as kinematic stability.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Describing now the drawings, it is to be understood that only enough of the construction of an exemplary embodiment of gear manufacturing or cutting machine has been depicted therein, in order to simplify the illustration, as needed for those skilled in the art to readily understand the underlying principles and concepts of the present invention. Furthermore, it is to be understood that the term "bevel gear" as used herein also encompasses "hypoid gears" and vice versa, and that the expression "gear cutting" is also to be understood as broad enough to include gear fabrication through the use of not only cutters but also other suitable stock- or material-removal tools, such as grinding tools.

Figure 1:
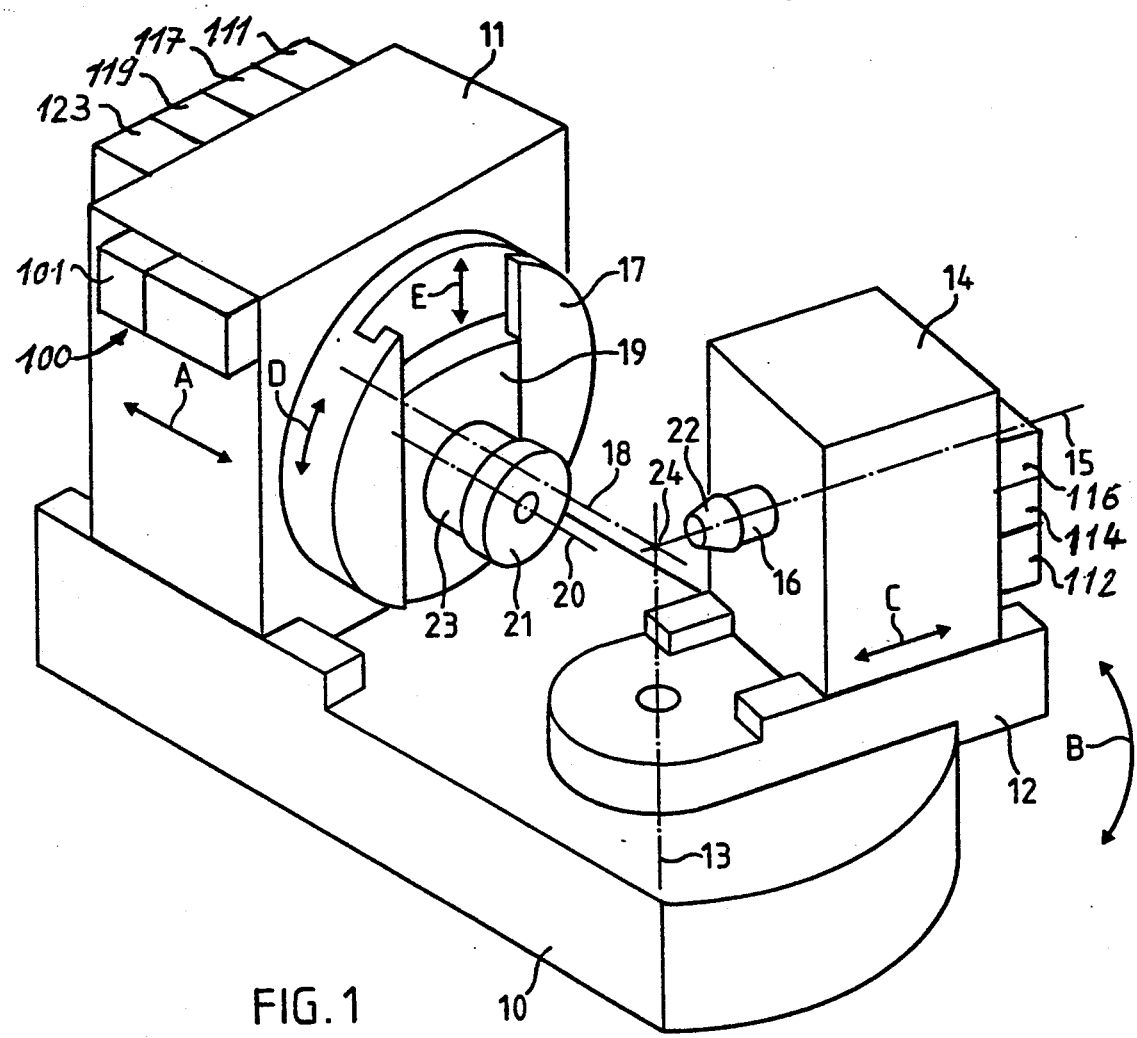
FIG. 1 is a perspective view of a machine constructed according to the present invention for manufacturing gears, particularly bevel or hypoid gears.

Turning attention first to FIG. 1, the gear cutting machine shown therein by way of example and not limitation, will be seen to comprise a machine base or bed 10. A generating stock or support 11 is displaceably mounted on the machine base 10 for movement in the direction of the double-headed arrow A. Also a pivotable or pivotal table 12 is displaceably mounted upon the machine base 10 for pivotal motion in the direction of the double-headed arrow B, about a predetermined pivot axis 13 defining the so-called base center. A headstock 14 is displaceably mounted upon the pivotable table 12 for movement in the direction of the double-headed arrow C. Mounted at the headstock 14 is a workpiece or work spindle 16 which is rotatable about a predetermined axis 15.

Continuing, it will be further seen that at the generating stock 11 there is rotatably mounted a generating drum 17 for rotational movement about a predetermined generating axis 18 in the direction of the double-headed arrow D. According to the present invention, an eccentric disk or eccentric 19 is displaceably mounted in the generating drum 17 for movement in the direction of the double-headed arrow E. A tool spindle 23 is rotatably mounted at the eccentric disk 19 for rotational movement about a predetermined axis 20. A suitable tool 21, for example, a cutter head for cutting a workpiece 22, is attached to the tool spindle 23. Furthermore, according to the present invention, the workpiece spindle 16 is spatially stationarily or fixedly arranged in the headstock 14 such that spindle axis 15 intersects at a point 24 the generating axis 18 and the pivot axis 13 which likewise intersect at point 24.

The workpiece 22 is chucked in conventional and thus here not further depicted manner at the workpiece spindle 16 by means of an automatic chucking device. The workpiece spindle 16 and tool spindle 23 are operated by infinitely variable rotational-speed regulatable drives 116 and 123, respectively, and the coupling thereof is accomplished by a rigid electronic transmission or gear box and electronic regulation means of a control computer 101. A number of further speed-regulated drives or drive means 111, 117, 114 and 112 respectively serve for the displacement of the generating stock 11, the rotation of the generating drum 17, the displacement of the headstock 14 radially with respect to the pivot axis 13, and for the displacement of the pivotable table 12 According to the present invention there is furthermore provided a controlled setting drive or drive means 119 for the displacement of the eccentric disk 19 so as to assume a defined or predeterminable eccentric position. All of these drives which are integrated into the gear cutting machine and also the electronic transmission or gear box constitute structure which is well known in this technology and therefore such have only been schematically depicted in the drawings. Also schematically shown is an electrical control console or panel 100 containing the control computer 101 which, for instance, as known in this art also can be arranged alongside the gear cutting machine. It is here remarked that particularly with the aid of the control computer 101, both during machine setup and also during the gear cutting or machining operation, the axes A to E, which define machine axes, can be automatically set or adjusted and regulated, that is to say, the directions indicated by the axes A to E also are to be understood as constituting machine axes A to E. According to the present invention, the machine axes B and C can be individually or collectively moved and regulated also during the gear cutting operation.

Instead of using as the tool 21 a cutter head, there can be also employed a grinding tool, for example, a dished grinding disk or wheel or cup-type grinding wheel for accomplishing an intermittent indexing operation or method.

Importantly, and in contrast to the gear cutting machines of the prior art heretofore considered in the introductory portion of this disclosure, the inventive gear cutting machine is devoid of any hypoid stock or at least one machine axis for setting of an axis-offset. However, in order to fabricate generated hypoid gears it is necessary for the tool 21, for example, a cutter head for cutting appropriate tooth spaces or gaps, to perform a generating motion about a generating gear having an offset axis. Since there are here missing the conventional hypoid setting means, the present invention contemplates additionally moving the workpiece itself in axial direction during the generating operation.

Figure 2:
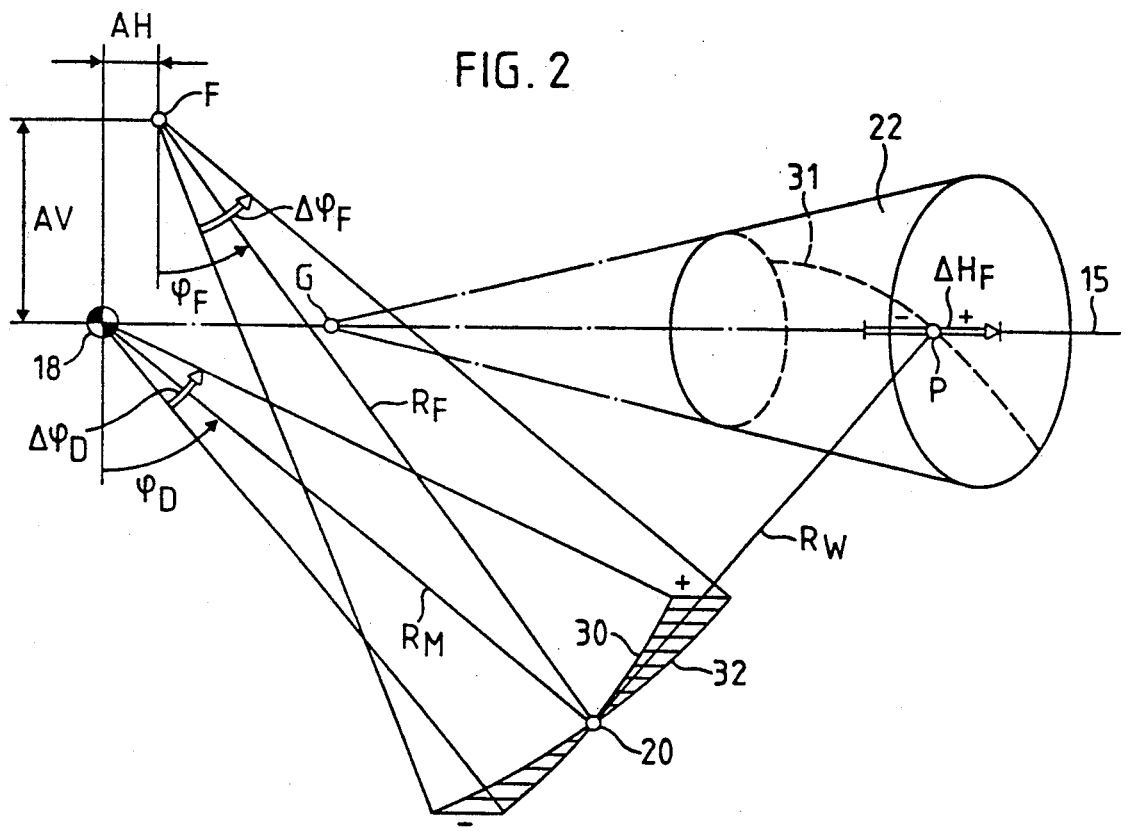
FIG. 2 is a schematic view depicting different important geometric magnitudes or parameters arising during cutting a hypoid gear as would be seen when viewed from the front of a generating drum.

At this point there will be explained the kinematic equivalent to the conventional axis-offset achieved by means of the hypoid stock and the generating drum based upon the showing of FIGS. 1, 2 and 3. The tool 21, here, for example, the cutter head, is placed by means of the eccentric disk or eccentric 19 at a fixed eccentric position having the radius $R_M$ at the generating drum 17. Moreover, with further reference to FIG. 2 it will be observed that the axis 20 and the generating axis 18 are orthogonal to the plane of the drawing and parallel to one another. Upon rotation of the generating drum 17 through an angle $\Delta\rho_D$ about the generating axis 18, this axis 20, also referred to as the cutter head axis 20, is moved in a circular arc along the line 30. Arranged upon the axis 15, also referred to as the workpiece axis 15, is the workpiece 22 having a cone apex G. By means of suitable and thus here not further shown cutters or stock-removal implements arranged at the cutter head 21, it is intended to conventionally cut at the workpiece 22 tooth spaces or gaps according to a generating operation, as such has been represented by a partial line 31, a computation point P and a cutter radius $R_W$. There should be, however, cut a hypoid gear having an axis-offset AV and a fictive or imaginary point of rotation F which is located at a distance AH from the generating axis 18. The cutter head 21 therefore would have to perform a generating or rolling motion with a radius $R_F$ through an angle $\Delta\rho_F$ about the point of rotation F along a line 32. According to the present invention, the compensation between the lines 30 and 32 is achieved by carrying out an additional lengthwise movement $\Delta H_F$ of the workpiece 22 in the direction of the tooth pitch cone 33 of the tooth flank 34 to be cut during rotation of the generating drum 17. In other words, to obtain correct kinematic conditions during a generating operation for cutting a hypoid gear, at this gear cutting machine the workpiece 22 must be moved relative to the cutter head 21 during the generating operation in the manner previously described. In contrast thereto, with the gear cutting machines of the heretofore discussed prior art the workpiece remains stationary during the generating operation, that is to say, it rotates about its axis only through the known differential amount.

Figure 3:
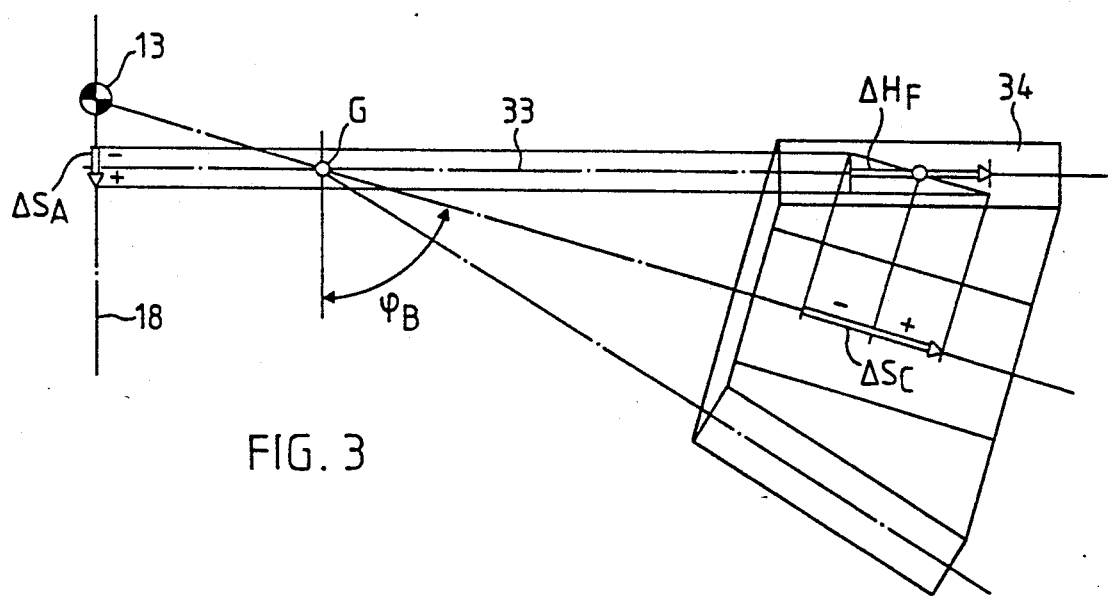
FIG. 3 is a partial top plan view of the illustration of FIG. 2.

The required supplementary or additional lengthwise movement $\Delta H_F$ of the workpiece 22 is realized with the gear cutting machine of the present development through additional movements $\Delta S_A$ and $\Delta S_C$ of the regulated machine axes A and C, that is to say, such is realized by means of the generating stock or support 11 and the headstock 14, as also will be appreciated by reference to FIG. 3. By means of the following equations $$V(\Delta\rho_F) = R_F \cos(\rho_F + \Delta\rho_F) = R_M \cos(\rho_D + \Delta\rho_D) + AV$$

$$H(\Delta\rho_F) = R_F \sin(\rho_F + \Delta\rho_F) = R_M \sin(\rho_D + \Delta\rho_D) - AH + \Delta H_F$$

there is imparted to the predetermined magnitudes $R_F$ and AV and the suitably selected magnitudes $R_M$ and AH an unambiguous correlation between the fictive or imaginary generating angle $\Delta\rho_F$ and the dependent magnitudes $\rho_D$ and $\Delta H_F$. By means of the following equations $$\Delta S_C = \frac{H_F}{\sin\rho_B}$$

$$\Delta S_A = \frac{H_F}{\tan\rho_B}$$

there can be realized the additional or supplementary movements $\Delta S_A$ and $\Delta S_C$ of the regulated machine axes A and C..

From these equations there are derived, for the machine setup, transformation or transfer functions for the control computer.

Figure 4:
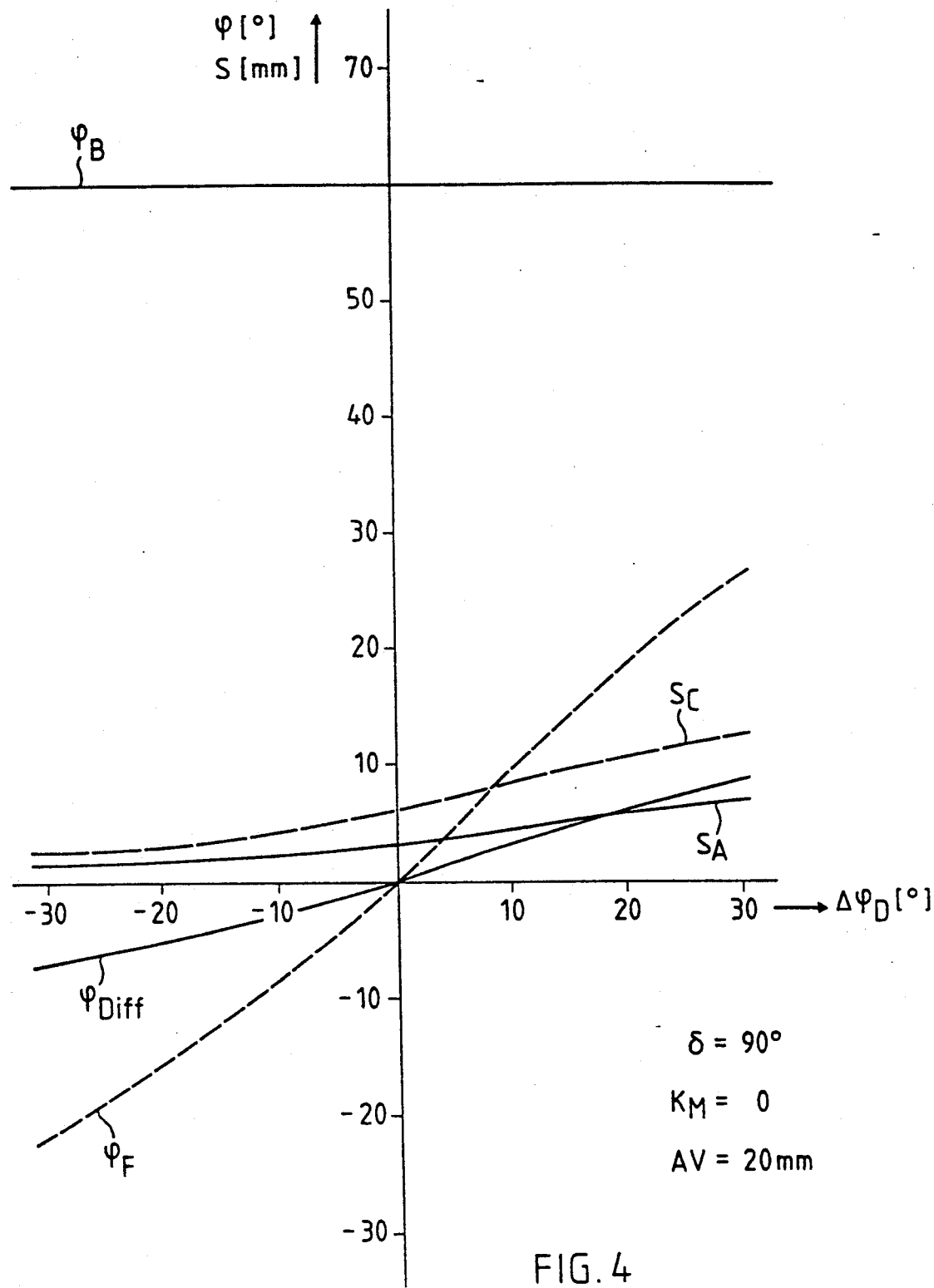
FIG. 4 is a diagram depicting movement patterns of machine axes of the gear manufacturing or cutting machine during a generating operation carried out during the fabrication of a hypoid gear.
Figure 5:
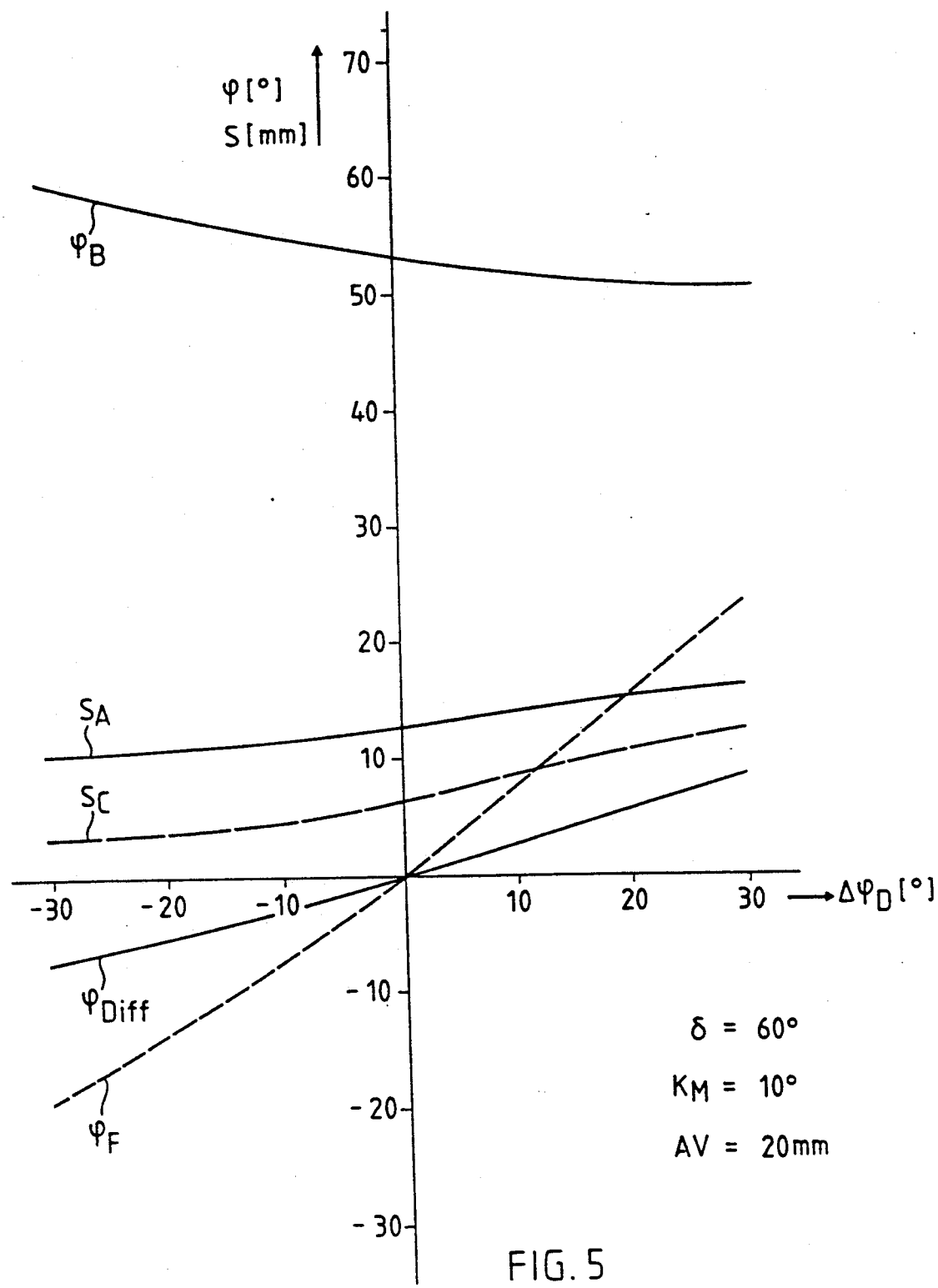
FIG. 5 is a diagram depicting the movement patterns of machine axes of the gear manufacturing or cutting machine, like in the showing of FIG. 4, but portraying additional inclined positions.

By virtue of the selectable pre-setting of the eccentric disk or eccentric 19 for the radius $R_M$ there is possible an optimum division between the rotational movement $\rho_D$ of the generating drum 17 and the additional lengthwise movement $\Delta H_F$, so that in the generating region there do not occur any movement reversals, the transformation functions become approximately linear and the control velocities are small. This will be readily apparent from the self-explanatory graphs of FIGS. 4 and 5 which portray the motion patterns of the machine axes A, B, C, D including the required additional movements and the known superimposed differential movement $\rho_{Diff}$ of the workpiece spindle 16 as a function of the generating drum rotation $\rho_D$. Both of these figures thus relate to the movement pattern for the indicated values of axis-offset AV, cutter head inclination $K_M$ and the pitch cone angle $\delta$ of the generating gear, in other words, FIG. 4 is depicted without and FIG. 5 with cutter head inclination or tilt and with generating crown gear or generating counter gear, respectively.

Since the fictive or imaginary rotational point F of the generating gear is not correlated to any particular machine component or part, there can be realized any random position within and also externally of the gear cutting machine. Consequently, there also can be fabricated without problem bevel gears having a large cone distance or length as well as spur gears. Due to the basically co-axial arrangement of the machine axis C and the workpiece spindle axis 15 problems do not arise when machining workpieces of varying length. Furthermore, there can be performed both intermittent indexing methods and continuous indexing methods for cutting gears with a cutter head as well as also intermittent indexing methods for grinding gears with a dished or cup-type grinding disk or wheel at the gear cutting machine. Additionally, it is not absolutely necessary that the workpiece spindle axis 15, the generating axis 18 and/or the pivot axis 13 intersect since appropriate compensating supplementary movements also can be realized by means of the control program.

While there are shown and described present preferred embodiments of the invention, it is distinctly to be understood the invention is not limited thereto, but may be otherwise variously embodied and practiced within the scope of the following claims.

What is claimed is:

1. A method of cutting hypoid gears containing teeth, each tooth having a pitch cone, at a gear cutting machine, comprising the steps of:

mounting a tool at a tool spindle having a tool spindle axis supported by an eccentric at a generating drum having a generating axis and arranged at a generating stock;

mounting a workpiece at a workpiece spindle having a workpiece spindle axis;

fixedly setting by means of the eccentric the tool spindle axis of the tool spindle at the generating drum in a predetermined position in relation to the generating axis;

rotating the generating drum; and as a function of the rotation of the generating drum moving the workpiece in the direction of the pitch cone of the tooth being cut in such a manner that the tool spindle axis of the tool spindle describes a resultant rotational movement about a fictive rotational axis of an imaginary generating gear having a substantially constant radius.

2. The method according to claim 1, wherein the gear cutting machine further comprises headstock and wherein:

the step of moving the workpiece is accomplished by performing a superimposed predetermined movement of a machine axis of the generating stock and a predetermined movement of a machine axis of the headstock.

* * * * *